(12) United States Patent  (10) Patent No.: US 9,013,772 B2
Kitai et al.  (45) Date of Patent: Apr. 21, 2015

(54) APPARATUS, SYSTEM, AND METHOD OF INSPECTING IMAGE, AND COMPUTER-READABLE MEDIUM STORING IMAGE INSPECTION CONTROL PROGRAM

(71) Applicants: Tadashi Kitai, Zama (JP); Takahiro Fukase, Kawasaki (JP)

(72) Inventors: Tadashi Kitai, Zama (JP); Takahiro Fukase, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/212,562

(22) Filed: Mar. 14, 2014

(65) Prior Publication Data
US 2014/0268260 A1 Sep. 18, 2014

(30) Foreign Application Priority Data

Mar. 15, 2013 (JP) .................................. 2013-053999
Feb. 10, 2014 (JP) .................................. 2014-023245

(51) Int. Cl.
G03F 3/08 (2006.01)
H04N 1/60 (2006.01)
G06K 9/00 (2006.01)

(52) U.S. Cl.
CPC .................................. H04N 1/6027 (2013.01)

(58) Field of Classification Search
None
See application file for complete search history.

(56) References Cited

U.S. PATENT DOCUMENTS

| 6,185,008 | B1* | 2/2001 | Shu et al. ....................... 358/1.9 |
| 6,330,075 | B1* | 12/2001 | Ishikawa ....................... 358/1.9 |
| 2004/0150844 | A1* | 8/2004 | Sanger ............................ 358/1.9 |
| 2005/0063014 | A1* | 3/2005 | Shinotsuka ..................... 358/3.1 |
| 2005/0083346 | A1* | 4/2005 | Takahashi et al. ............. 345/600 |
| 2005/0195440 | A1* | 9/2005 | Inoue ............................ 358/3.14 |
| 2006/0007252 | A1* | 1/2006 | Mahy et al. ....................... 347/3 |
| 2006/0007256 | A1* | 1/2006 | Tanaka et al. .................... 347/15 |
| 2007/0053003 | A1* | 3/2007 | Loce et al. .................... 358/3.06 |
| 2007/0274602 | A1* | 11/2007 | Iriyama ......................... 382/252 |
| 2008/0111998 | A1* | 5/2008 | Edge .............................. 358/1.9 |
| 2008/0216695 | A1* | 9/2008 | Ozaki et al. .................... 101/484 |
| 2009/0027705 | A1* | 1/2009 | Ozaki et al. .................... 358/1.9 |
| 2010/0134809 | A1* | 6/2010 | Chang ............................. 358/1.9 |
| 2012/0008170 | A1* | 1/2012 | Yan ............................. 358/3.06 |
| 2013/0094036 | A1* | 4/2013 | Itagaki ........................... 358/1.9 |
| 2013/0250322 | A1* | 9/2013 | Kawabata et al. ............. 358/1.9 |
| 2013/0265615 | A1* | 10/2013 | Nakashima .................. 358/3.27 |
| 2014/0111836 | A1* | 4/2014 | Aharon et al. ................ 358/504 |
| 2014/0119593 | A1* | 5/2014 | Filler ............................ 382/100 |

FOREIGN PATENT DOCUMENTS

JP 2011-156861 8/2011

* cited by examiner

Primary Examiner — Madelein A Nguyen

(74) Attorney, Agent, or Firm — Oblon, McClelland, Maier & Neustadt, L.L.P.

(57) ABSTRACT

An information processing apparatus including a read image obtainer and a setting value calculator implemented by circuitry. The read image obtainer obtains a scanned determination image, including a plurality of different dot patterns output by an image forming apparatus on a recording medium. The setting value calculator, for each of the different dot patterns of the obtained scanned determination image, determines densities of different colors of the respective dot pattern and a total number of pixels influencing the density of each coefficient of a dot gain correction filter, with respect to each target pixel. The setting value calculator further configured calculates the coefficients of the dot gain correction filter based on the determined densities of the different colors of the different dot patterns and the total number of pixels, determined for each coefficient of the dot gain correction filter and for each of the different dot patterns.

7 Claims, 13 Drawing Sheets

SCANNED IMAGE  MASTER IMAGE

FIG. 11

|   |   |   |
|---|---|---|
| D | B | D |
| C | A | C |
| D | B | D |

FIG. 12A

| COEFFICIENT | VALUE |
|---|---|
| a | 1.00 |
| b | 0.20 |
| c | 0.15 |
| d | 0.05 |

FIG. 12B

| COEFFICIENT | VALUE |
|---|---|
| a | 0.80 |
| b | 0.05 |
| c | 0.05 |
| d | 0.00 |

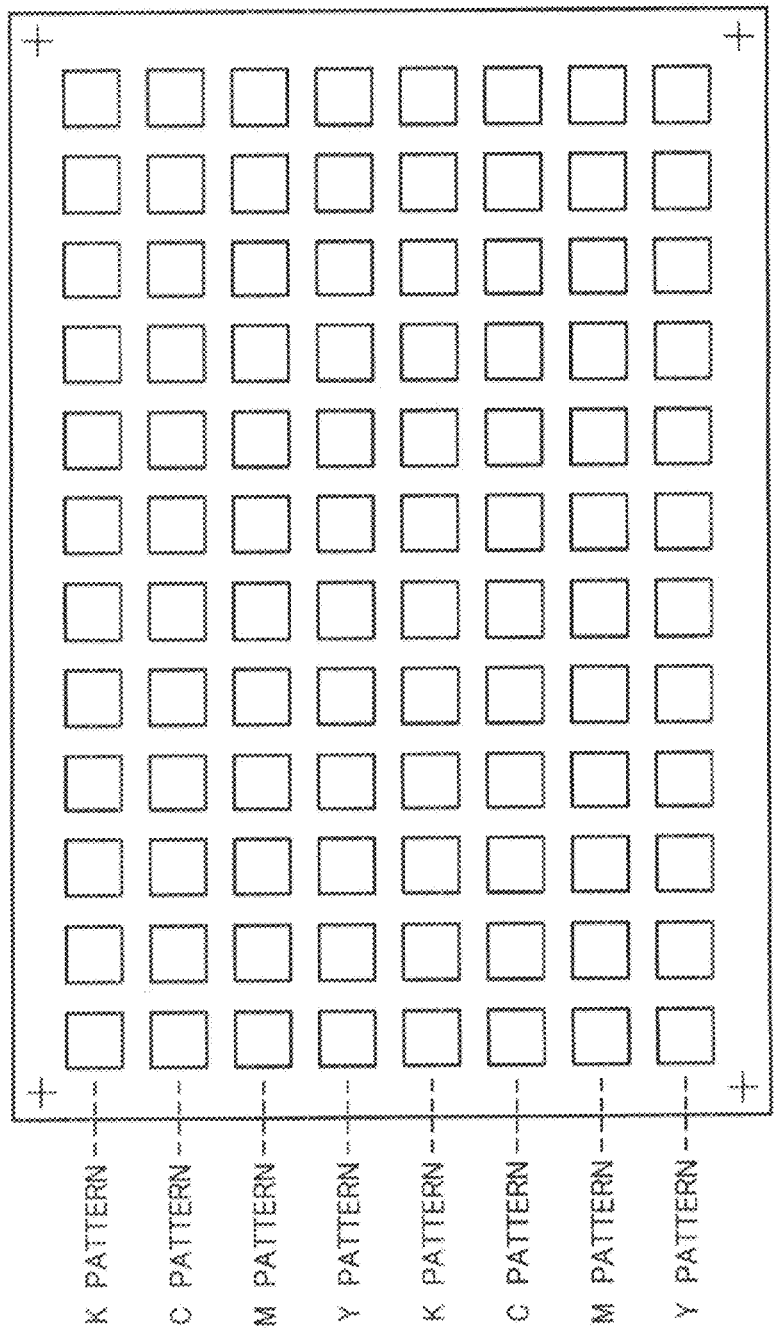

FIG. 16

| BATCH | DENSITY R | DENSITY G | DENSITY B |
|---|---|---|---|
| #1 | XXX | XXX | XXX |
| #2 | XX | XX | XX |
| #3 | XX | XX | XX |
| ... | ... | ... | ... |

FIG. 18

| BATCH | A | B | C | D |
|---|---|---|---|---|
| #1 | 32 | 64 | 64 | 128 |
| #2 | 32 | 32 | 32 | 64 |
| #3 | 16 | 16 | 16 | 16 |
| ... | ... | ... | ... | ... |

APPARATUS, SYSTEM, AND METHOD OF INSPECTING IMAGE, AND COMPUTER-READABLE MEDIUM STORING IMAGE INSPECTION CONTROL PROGRAM

CROSS-REFERENCE TO RELATED APPLICATIONS

This patent application is based on and claims priority pursuant to 35 U.S.C. §119 to Japanese Patent Application Nos. 2013-053999, filed on Mar. 15, 2013, and 2014-023245, filed on Feb. 10, 2014, in the Japan Patent Office, the entire disclosures of which are hereby incorporated by reference herein.

BACKGROUND

1. Field of the Invention

The present disclosure relates to an apparatus, system, and method of inspecting an image formed by an image forming apparatus, and a non-transitory computer-readable medium storing an image inspection control program.

2. Description of the Related Art

Conventionally, inspection of printed matter has been performed by human operators. In recent years, inspection apparatuses that automatically inspect printed matter have been widely used, mainly in the field of offset printing. For example, in conventional devices, a master image would be generated by reading specific printed matter that was selected based on image quality, as a reference image. Corresponding portions of the master image and a subsequently read image of printed matter would be compared to determine, by the degree of difference therebetween, whether there was a defect in the printed matter.

Printing apparatuses, such as electrophotographic apparatuses, have been widely used to print a small number of pages. For example, a printing apparatus may perform variable printing in which the printed contents differ on each page. In such a case, comparing the printed matter, with a master image generated from previously printed matter, would be inefficient. In view of this, the master image has typically been generated based on print data and then compared with the printed image to be inspected.

Japanese Patent Application Publication No. 2011-156861-A proposes a method of generating the master image, in consideration of a dot gain, to further the accuracy in determining the defects in the read image.

Specifically, correction of the master image is made according to a dot gain (i.e., pixel output characteristics) for different kinds of sheets, which are determined beforehand. Although JP 2011-156861-A discusses a method of calculating in advance the dot gain (i.e., the output characteristics for each pixel) for each of the kinds of sheets, it does not disclose the method of the calculating in detail. A method of calculating output characteristics for every pixel exactly is required to perform accurate correction. Furthermore, the output characteristics of every pixel may fluctuate by not only the kind of the sheet but also the state of the device. Therefore, in order to reduce the burden on an operator, a method of calculating dot gain that is effective and capable of being repeated effectively is needed. In addition, such a problem can equally occur for other recording media such as films, not only to the case of outputting an image to paper.

In view of the above, the inventors of the present embodiments have discovered that there is a need for an apparatus, a system, a method, and a non-transitory computer-readable medium storing an image inspection control program, each of which is capable of calculating an output characteristic for every pixel for correction of an inspection reference image, in the system which inspect a result of an image forming output by comparing between an image read from a recording media and the inspection reference image.

SUMMARY

In one embodiment of the present disclosure, there is provided an information processing apparatus including a read image obtainer and a setting value calculator implemented by circuitry. The read image obtainer is configured to obtain a scanned determination image including a plurality of different dot patterns output by an image forming apparatus on a recording medium. The determination image is an image output by the image forming apparatus to determine output characteristics of the image forming apparatus. The setting value calculator is configured to, for each of the different dot patterns of the obtained scanned determination image, determine densities of different colors of the respective dot pattern and determine a total number of pixels influencing the density of each coefficient of a dot gain correction filter, with respect to each target pixel. The read image obtainer is further configured to calculate the coefficients of the dot gain correction filter based on the determined densities of the different colors of the different dot patterns and the total number of pixels, determined for each coefficient of the dot gain correction filter and for each of the different dot patterns.

In another embodiment of the present disclosure, there is provided a method of an information processing apparatus for dot gain correction. The method includes obtaining a scanned determination image including a plurality of different dot patterns output by an image forming apparatus on a recording medium. The determination image is an image output by the image forming apparatus to determine output characteristics of the image forming apparatus. Further, for each of the different dot patterns of the obtained scanned determination image, densities of different colors of the respective dot pattern and a total number of pixels influencing the density of each coefficient of a dot gain correction filter, with respect to each target pixel, are determined. The method further includes calculating, by circuitry of the information processing apparatus, the coefficients of the dot gain correction filter based on the determined densities of the different colors of the different dot patterns and the total number of pixels, determined for each coefficient of the dot gain correction filter and for each of the different dot patterns.

In another embodiment of the present disclosure, there is provided a non-transitory computer-readable storage medium which, when executed by a computer, causes the computer to perform the method described above.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 11 shows an example dot gain correction filter according to an exemplary embodiment;

FIGS. 12A and 12B show examples of the coefficients of the dot gain correction filter according to an exemplary embodiment;

FIG. 14 shows an example of an entire pattern output for calculation of dot gain correction parameters according to an exemplary embodiment;

FIG. 16 shows examples of the densities of each patch that is extracted from the read image of the square patches according to an exemplary embodiment;

FIG. 18 shows examples of the coefficients for calculating the dot gain correction parameters according to an exemplary embodiment.

Figure 1:
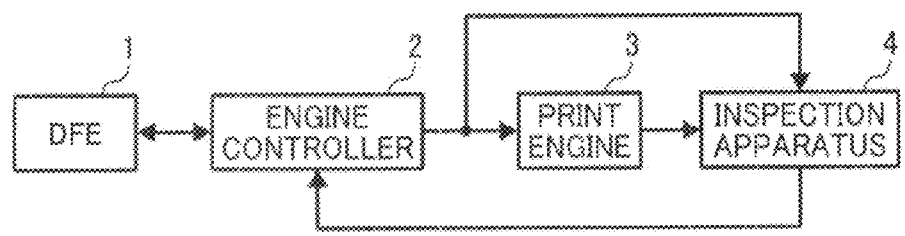
FIG. 1 shows a schematic configuration of an image forming system including an inspection apparatus according to an exemplary embodiment.

The accompanying drawings are intended to depict exemplary embodiments and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present embodiments. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits, field programmable gate arrays (FPGAs) calculators or the like. These terms in general may be referred to as processors and/or circuitry.

Unless specifically stated otherwise, or as is apparent from the discussion, terms such as "processing" or "calculating" or "determining" or "displaying" or the like, refer to the action and processes of a calculator system, or a similar electronic calculating device, that manipulates and transforms data represented as physical, electronic quantities within the calculator system's registers and memories into other data similarly represented as physical quantities within the calculator system memories or registers or other such information storage, transmission or display devices.

Embodiments of the present disclosure include a method of dot gain correction and generation of one or more parameters for the dot gain correction used to generate a master image. A dot gain corresponds to output characteristics of an apparatus that performs the image forming output.

FIG. 1 shows an example configuration of an image forming system according to an exemplary embodiment. As shown in FIG. 1, the image forming system includes, for example, a digital front end (DFE) 1, an engine controller 2, a print engine 3 and an inspection apparatus 4. Based on a received print job, the DFE 1 generates bitmap data, which is image data to be output (i.e., an output-target image), and outputs the generated bitmap data to the engine controller 2.

Based on the bitmap data received from the DFE 1, the engine controller 2 controls the print engine 3 to conduct an image forming operation. In certain embodiments, the DFE 1 functions as an image processing apparatus. Further, the DFE 1 adjusts a density of the bitmap data generated based on a state change of the print engine 3, which in certain embodiments functions as an image forming apparatus.

The engine controller 2 transmits the bitmap data received from the DFE 1 to the inspection apparatus 4. The bitmap data is then used as original information for preparing an inspection reference image to be used for inspection, where the inspection at the inspection apparatus 4 includes inspecting an output result of an image forming operation of the print engine 3.

Under the control of the engine controller 2, the print engine 3 conducts an image forming operation on a recording medium such as paper, using the bitmap data. The engine controller 2 scans an output paper, such as a paper printed with an image, using a scanner, and inputs the read image data into the inspection apparatus 4. The recording medium may be, for example, a sheet, such as paper, film, plastic sheet, and any material that can be used for outputting (i.e., forming) an image by an image forming operation. Based on the bitmap data input from the engine controller 2, the inspection apparatus 4 generates a master image. The inspection apparatus 4 adjusts the density of the master image based on a dot gain of the print engine 3. The inspection apparatus 4 generates one or more parameters (e.g., filter coefficients) for the density correction/adjustment, as further discussed below. The inspection apparatus 4 compares the read image data, input from the print engine 3, with the generated master image to conduct an image inspection of the output image, in which the inspection apparatus 4 is used as an image inspection apparatus.

When the inspection apparatus 4 determines that the read image, generated from the printed image, has a defect in the output result, the inspection apparatus 4 notifies the engine controller 2 that the page corresponding to the read image has a defect. Accordingly, reprinting of the page having the defect is carried out by the engine controller 2.

Figure 2:
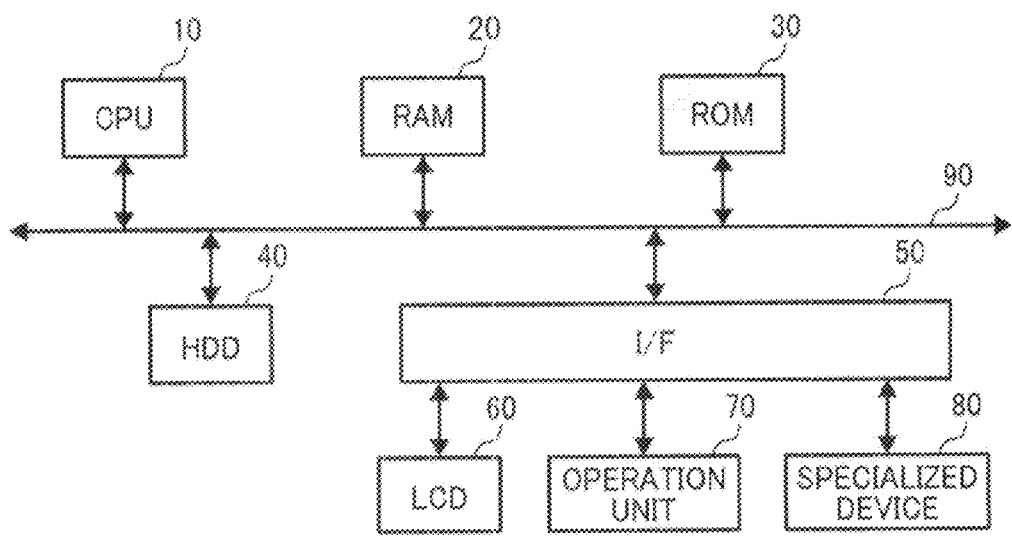
FIG. 2 shows an example block diagram of a hardware configuration of the inspection apparatus according to an exemplary embodiment.

A description follows of the hardware configuration of the engine controller 2, the print engine 3, and the inspection apparatus 4 according to an exemplary embodiment with reference to FIG. 2. Further, with respect to the inspection apparatus 4, scanner and printer engines may be incorporated into the hardware configuration shown in FIG. 2. FIG. 2 shows a block diagram of an exemplary hardware configuration of the inspection apparatus 4. The engine controller 2 and the print engine 3 may have a hardware configuration similar to the inspection apparatus 4 shown in FIG. 2.

As shown in FIG. 2, the inspection apparatus 4 may be configured similarly to information processing apparatuses such as general servers, personal computers (PC), or the like. Specifically, the inspection apparatus 4 includes a central processing unit (CPU) 10, a random access memory (RAM) 20, a read only memory (ROM) 30, a hard disk drive (HDD) 40, and an interface (I/F) 50, each connectable to each other via a bus 90. Further, a I/F 50 is connectable to a liquid crystal display (LCD) 60, an operation unit 70, and a specialized device 80.

The CPU 10 is implemented by a processor or circuitry, such as a microprocessor, which is capable of controlling the entire operation of the inspection apparatus 4. The RAM 20 is implemented by a volatile memory that writes various data thereto or reads various data therefrom with relatively high speeds. The RAM 20 may be used as a work memory area of the CPU 10. The ROM 30 is implemented by a nonvolatile memory from which various data is read. The ROM 30 may store various programs such as firmware. The HDD 40 is implemented by a nonvolatile memory from which various data is read and is an example of a non-transitory computer-readable medium. The HDD 40 may store various control programs such as an operating system (OS) and application programs, such as the inspection control program. It should be noted that the term "non-transitory" is a limitation of the medium itself (i.e., tangible, not a signal) as opposed to a limitation on data storage persistency (e.g., RAM vs. ROM).

The I/F 50 allows various hardware devices to be connected through the bus 90 or to the outside through a network, and controls these connections. The LCD 60 functions as a user interface, which allows a user to visually check the status of the inspection apparatus 4. The operation device 70 functions as a user interface, which allows the user to input various data to the inspection apparatus 4 using, for example, a keyboard or a mouse. The LCD 60 and the operation device 70 may be integrated into one device, for example, in the form of a touch panel screen.

The specialized device 80 may be disposed as hardware configured to conduct a specific capability or function for each of the engine controller 2, the print engine 3, and the inspection apparatus 4. For example, as for the print engine 3, the specialized device 80 may be a plotter configured to conduct an image forming operation on sheets, and/or a scanner configured to scan images output on the sheets. Further, as for the engine controller 2 and the inspection apparatus 4, the specialized device 80 may be a specific calculating circuit to conduct high speed image processing, and the specialized device 80 may be, for example, an application specific integrated circuit (ASIC).

In the above described hardware configuration, software programs stored in a storage area such as the ROM 30, the HDD 40, or an optical disk may be read and loaded into the RAM 20. The CPU 10 could run such programs to control various units, which could configure a software-executing controller. Configuration of a functional block to operate the engine controller 2, the print engine 3, and the inspection apparatus 4 may be carried out using such a software-executing controller and hardware. In an exemplary embodiment, at least one of the units is implemented as hardware or as a combination of hardware and software.

Figure 3:
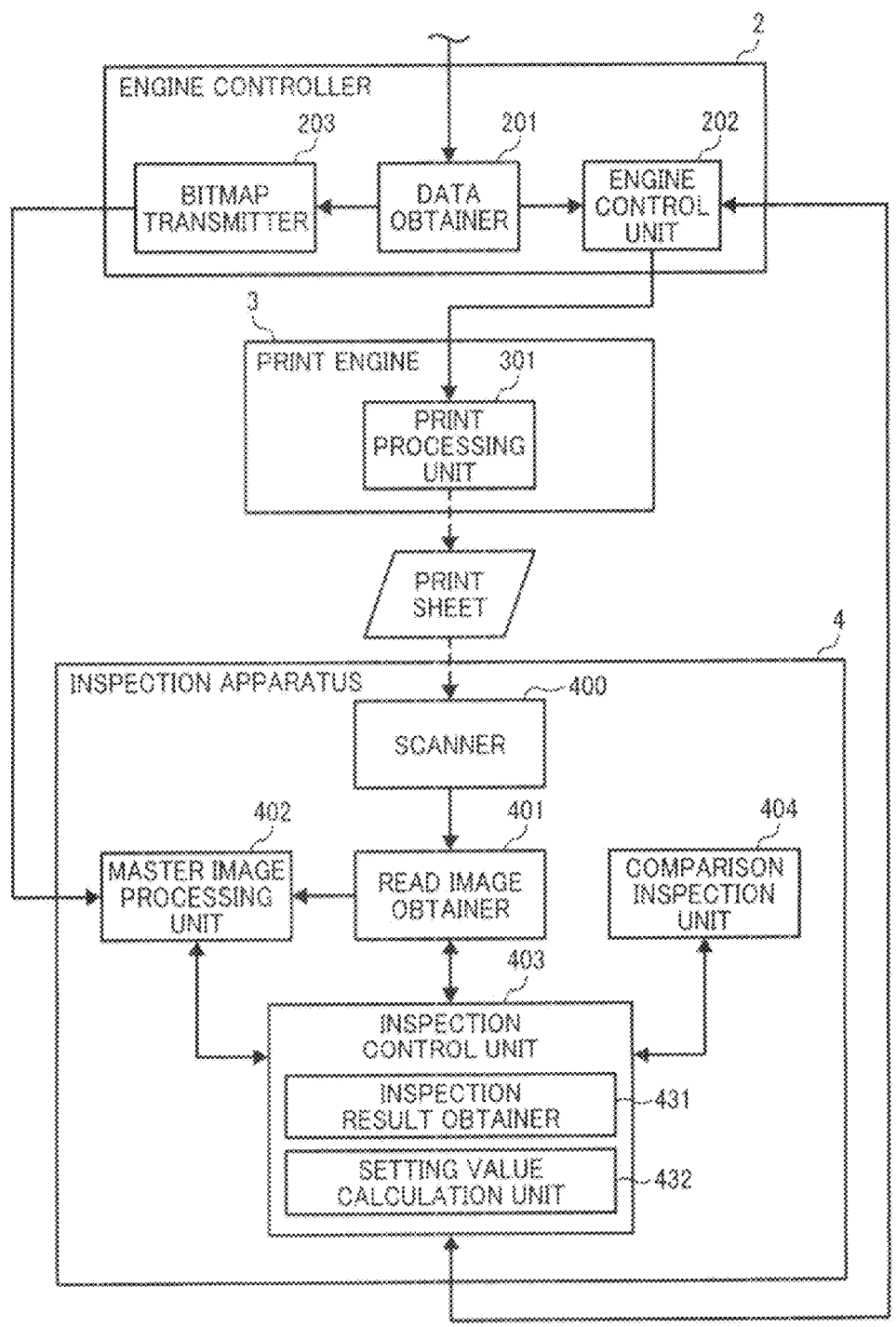
FIG. 3 shows an example block diagram of an engine controller, a print engine, and an inspection apparatus according to an exemplary embodiment.

FIG. 3 shows an example block diagram of the engine controller 2, the print engine 3, and the inspection apparatus 4. In FIG. 3, the solid lines show the data, and the broken lines show the flow of the recording sheets. As shown in FIG. 3, the engine controller 2 includes, for example, a data obtainer 201, an engine control unit 202, and a bitmap transmitter 203.

Further, the print engine 3 includes, for example, a print processing unit 301 and the inspection apparatus 4 includes, for example, a scanner 400, a read image obtainer 401, a master image processing unit 402, an inspection control unit 403, and a comparison inspection unit 404. The inspection control unit 403 includes, for example, an inspection result obtainer 431 and a setting value calculation unit 432.

Upon obtaining the bitmap data and a gradation correction table from the DFE 1 by way of the data obtainer 201, the engine control unit 202 and the bitmap transmitter 203 execute their respective operations. The bitmap data is pixel information composing an image that is to be output by an image forming operation. The data obtainer 201 can operate as a pixel information obtainer. Based on the bitmap data transferred from the data obtainer 201, the engine control unit 202 instructs the print engine 3 to conduct an image forming operation, in which the engine control unit 202 can operate as an output execution control unit. The bitmap transmitter 203 transmits the bitmap data and the gradation correction table, obtained by the data obtainer 201, to the inspection apparatus 4.

The gradation correction table includes parameters for density correction and is referred to when the bitmap data is generated by the DFE 1 from the image data included in the print job. The DFE 1 adjusts the density of the bitmap data based on the gradation correction table, wherein the gradation correction table indicates the density of an image output characteristic of the print engine 3. The inspection apparatus 4 receives the gradation correction table for master image generation depending on the original density of the image.

The print processing unit 301 obtains the bitmap data input from the engine controller 2, conducts an image forming operation, which transfers the image onto a sheet, and outputs a corresponding printed sheet. Therefore, the print processing unit 301 can implement image forming within an image forming apparatus, that is to say, an output mechanism. The print processing unit 301 is able to use any type of image forming mechanism including, for example, electrophotography, inkjet, or the like.

The print processing unit 301 outputs a color patch (hereinafter, referred to as a color patch for the dot gain correction) to generate parameters (e.g., dot gain correction filter coefficients) for density correction (hereinafter, referred to as a dot gain correction) depending on the dot gain on the sheet, according to an example embodiment.

The scanner 400 scans an image formed on the sheet, by conducting a printing operation by the print processing unit 301, and outputs read data. The scanner 400 is, for example, a line scanner disposed along a transport route of the sheet output by the print processing unit 301. The scanner 400 scans the transported sheet face thereby reading an image formed on the sheet.

The read image, which is read by the scanner 400, is an inspection target, which is inspected by the inspection apparatus 4. Because the read image is obtained from the sheet face on which is formed the output image, the read image is an image indicating the output result.

The read image obtainer 401 obtains the read image data, generated by the scanner 400 scanning the sheet face. The read image obtainer 401 outputs the read image data, as an inspection target image, to the comparison inspection unit 404. In addition, the read image data is output to the comparison inspection unit 404 via the inspection result obtainer 431. Specifically, the inspection result obtainer 431 acquires the read image data and then outputs the read image data to the comparison inspection unit 404.

As described above, the color patch for the dot gain correction is output by the print engine 3 to be read by the scanner 400. Thereafter, the read image obtainer 401 obtains the read image of the color patch for the dot gain correction and inputs it to the inspection control unit 403 to generate the parameters (e.g., dot gain correction filter coefficients) for density correction.

As described above, the master image processing unit 402 obtains the bitmap data input from the engine controller 2, and generates a master image for use as an inspection reference image for comparison with the inspection target image. Therefore, based on the output-target image, the master image processing unit 402 operates as an inspection reference image generator that generates the master image acting as the inspection reference image for use in inspecting the read images.

The inspection control unit 403 controls the inspection apparatus 4 as a whole, and each unit in the inspection apparatus 4 is operated under the control of the inspection control unit 403. Among each modules included in the inspection control unit 403, the inspection result obtainer 431 inputs the master image generated by the master image processing unit 402 and the read image obtained by the read image obtainer 401 into the comparison inspection unit 404 to obtain the comparison result. Moreover, the setting value calculation unit 432 conducts dot gain correction of an image, which is discussed in greater detail below.

The comparison inspection unit 404 is used as an image inspection unit that compares the read image data, input from the read image obtainer 401, and the master image, generated by the master image processing unit 402, to determine whether the desired image forming operation has been conducted. The comparison inspection unit 404 may be implemented by the above mentioned ASIC or the like to process a large amount of data with high speed.

The comparison inspection unit 404 compares the read image data and the master image expressed via 8-bits for each one of R, G, and B (total 24 bits) for each corresponding pixel. In particular, for each pixel, the comparison inspection unit 404 calculates pixel value differences for each one of R, G, and B. Based on a comparison of the calculated differences and a threshold, the inspection result obtainer 431 determines whether a defect has occurred in the read image data. That is to say, the inspection result obtainer 431 can function as an image inspection unit by controlling all parts included in the inspection apparatus 4.

Figure 4:
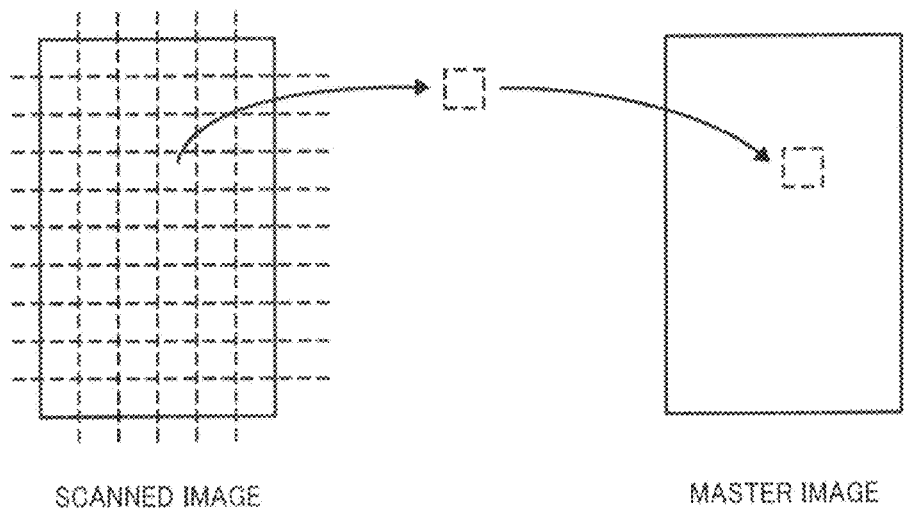
FIG. 4 shows a process of comparing images for inspection according to an exemplary embodiment.

When comparing the read image with the master image, the inspection result obtainer 431 superimposes a segmented portion of the read image onto an apparently corresponding segment of the master image as is illustrated in FIG. 4 in order to calculate any difference in pixel values, that is, any difference in intensity values between the pixels. In order to confirm the correspondence, the inspection result obtainer 431 shifts the segmented portion (or image range) of the read image to be superimposed on the corresponding area in the master image in the vertical and horizontal directions, to determine the position where the calculated difference values (e.g., a value for each of R, G, and B) is the smallest. This position is determined as a correct superimposed position and the corresponding calculated difference values are set as the comparison result. By the above processing, a position of the master image is matched to a correct position of the read image in order to ensure a correct calculation of the R, G, and B difference values.

In addition, computational complexity can be reduced by not superimposing the entire master image onto the read image. Furthermore, even if there is a difference between the entire read image and the entire master image, it is possible to reduce the influence of the difference by aligning and dividing the image for each portion, as is shown in FIG. 4.

Further, the inspection result obtainer 431 is able to compare the pixel difference values and the threshold as follows. For example, the difference values calculated for each of the pixels may be summed for a given area of an image to a total value. The total value is then compared with the set threshold. The given area for summing the difference values for each of the pixels is, for example, a dot square area (e.g., as illustrated in FIG. 4) such as of 20 dots. In an exemplary embodiment, the set threshold is a value corresponding to the total difference value for the given area (hereinafter, the defect area) obtainable by summing values of the differences (e.g., the difference for each of R, E and B). The comparison inspection unit 404 is able to output position information for the defect area of an image having a total difference value exceeding the threshold. This position information is useable as information indicating the presence of a defect in the read image data. The position information in the image is defined by, for example, the coordinate information of the image.

Moreover, in the said embodiment, the comparison inspection unit 404 computes and outputs the difference values of the pixel, which is included in the master image, and the pixel which is included in the reading image. In one example, a comparison between the difference values and the threshold value is performed by the inspection result obtainer 431. In addition, the comparison inspection unit 404 computes and outputs the difference values between the pixel, which is included in the master image, and the pixel, which is included in the read image. Further, a comparison between the difference values and the threshold value may be performed by the comparison inspection unit 404. In addition, the comparison inspection unit 404 may output information of the comparison inspection to the inspection result obtainer 431.

Figure 5:
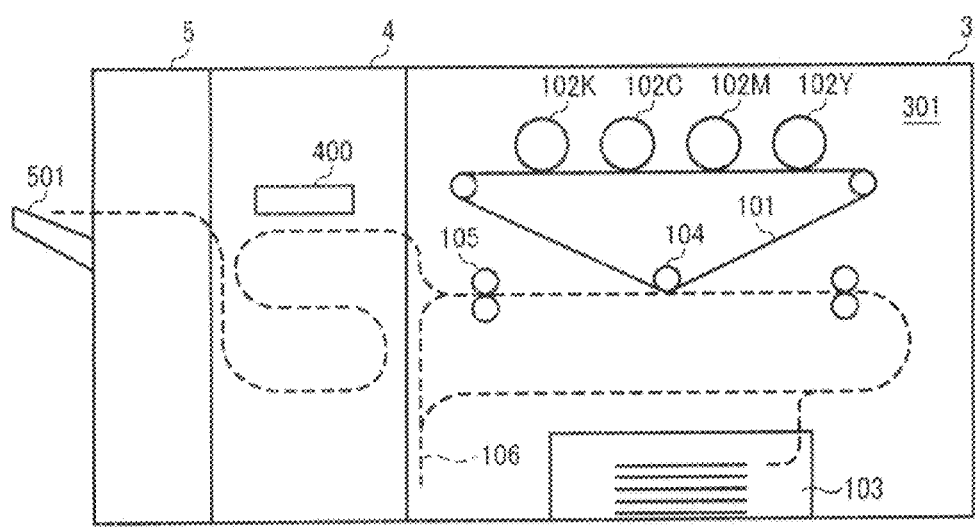
FIG. 5 shows a schematic mechanical configuration of a print processing unit according to an exemplary embodiment.

The image inspection system of FIG. 5 may be implemented by a system including a print engine 3, an inspection apparatus 4, and a stacker 5. The print engine 3 is implemented as a tandem-type image forming device. More specifically, the print engine 3 includes a plurality of photoconductive drums 102Y, 102M, 102C, and 102K (collectively referred to as the photoconductive drum 102), which are disposed side by side along a transfer belt 101 in the direction upstream of the sheet transfer direction. The transfer belt 101, which is an endless belt, is an intermediate transfer belt, which is formed with an intermediate transfer image to be transferred onto the recording sheet fed by a sheet feeding tray 103. In operation, the toner images of the respective colors, which are formed on the surfaces of the photoconductive drums 102, are transferred to the transfer belt 101 one above the other in order to form the full-color toner image.

The full-color toner image formed on the transfer belt 101 is conveyed to a transfer position between a transfer roller 104 and a sheet transfer path (indicated by the dotted line). At the transfer position, the full-color toner image is transferred from the transfer belt 101 onto the recording sheet, which is transferred along the sheet transfer path by a plurality of transferring rollers 104.

The recording sheet, having the full-color toner image formed thereon, is further conveyed to a fixing roller 105. The fixing roller 105, together with a pressure roller, fixes the toner image onto the recording sheet by heat and pressure. The recording sheet is then conveyed into the inspection apparatus 4. In case of printing double-sided images, the recording sheet having one side with the toner image fixed thereon, is conveyed into a switchback path 106, and transferred back into the transfer roller 104 so that another image can be formed on the other side of the recording sheet.

In the sheet conveyance route inside the inspection apparatus 4, the scanner 400 reads each sheet surface conveyed from the print processing part 301, and outputs the sheet to the read image obtainer 401, which forms a read image. The read image obtainer 401 is included inside the inspection apparatus 4. Moreover, the read sheet is further conveyed inside the inspection apparatus 4, is conveyed by the stacker 5, and is ejected by the scanner 400 at the paper delivery tray 501. In addition, in FIG. 5, there is illustrated an exemplary case in which the scanner 400 is implemented with respect to only one side of a sheet in the conveyance route of the sheet in the inspection apparatus 4. However, since the inspection of both surfaces of the sheet is possible, the scanner 400 may also be positioned with respect to both surfaces of the sheet.

Figure 6:
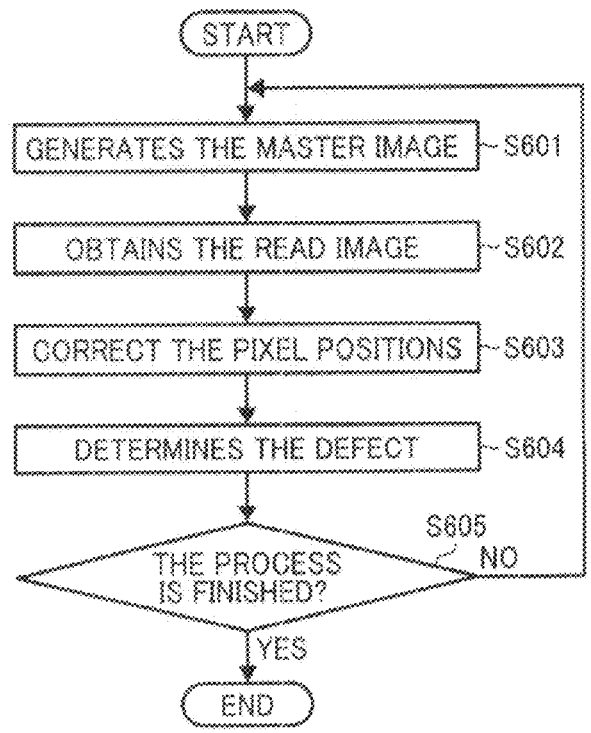
FIG. 6 shows an example flowchart illustrating an inspection process according to an exemplary embodiment.

Referring now to FIG. 6, an overview of the operation of the inspection apparatus 4 is explained according to an exemplary embodiment. As shown in the examples of FIG. 510A-10C, in the image inspection by the inspection apparatus 4, based on the bitmap data and the gradation correction table input from the bitmap transmitter 203, the master image processing unit 402 generates the master image in step S601.

The bitmap transmitter 203 transmits the bitmap data to the inspection apparatus 4. Around this time, the print engine 3 transports the sheet made by the image forming operation into the inspection apparatus 4. Then, the scanner 400 reads the sheet and the read image obtainer 401 obtains the read image in step S602.

After the read image obtainer 401 obtains the read image, the inspection result obtainer 431 lets the master image processing unit 402 correct the pixel positions of the read image, which is obtained by the read image obtainer 401, or the master image, such that the positional shift in the read image is corrected in step S603.

In step S603, as described above referring to FIG. 4, the inspection result obtainer 431 extracts a portion, which corresponds to a predetermined range around a reference point, of the master image. Further, in step S603, the inspection result obtainer 431 extracts a portion of the read image, at a position corresponding to the master image portion, from the read image to input the read image portion to the comparison inspection unit 404. Further, in step S603, as described above referring to FIG. 4, the inspection result obtainer 431 calculates pixel value differences between the master image and the read image.

The inspection result obtainer 431 shifts the read image portion, extracted from the read image, left/right and/or up/down and repeatedly acquires a result of the difference calculation by the comparison inspection unit 404 in order to determine the read image extraction area at a position having the smallest difference with respect to the master image extraction area. The inspection result obtainer 431 determines the amount of positional deviation between the read image extraction area and the master image extraction area as the reference point positional deviation amount.

The inspection result obtainer 431 repeats the above processing for a number of reference points extracted from the master image in order to determine the definitive positional deviation amount based on the positional deviation amounts calculated for each reference point. The definitive positional deviation amount can be determined, for example, by adopting an average of the positional deviation amounts calculated for each reference point and by calculating each positional deviation amount by linear interpolation based on each reference point.

The inspection result obtainer 431 compares the master image and the read image based on the positional deviation amount in step S604. As described above, a comparison between the master image and the read image is executed upon matching the position of the master image and the read image.

The inspection result obtainer 431 obtains the position of the read image (hereinafter, a defect position information) which has the defect from the comparison inspection unit 404. The defect position information is displayed on LCD 60, or any other display type, connected to the inspection apparatus 4 or is transmitted to the engine controller 2 through the network.

The inspection result obtainer 431 repeats the process from steps S601 to S604 until the inspection of all pages is finished. The process is finished when steps S601 to S604 is finished for all pages (S605/YES).

Figure 7:
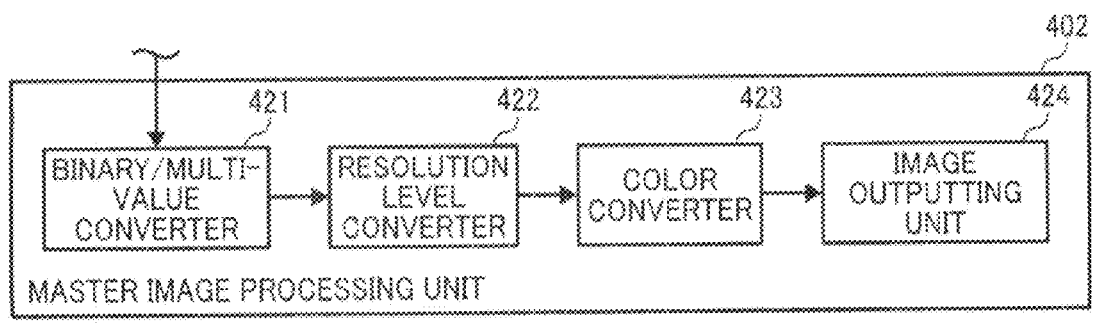
FIG. 7 shows an example block diagram of a master image processing unit according to an exemplary embodiment.

A description is given of the master image processing unit 402 and the processing performed in step S601. FIG. 7 shows an example block diagram of the master image processing unit 402. As shown in FIG. 7, the master image processing unit 402 includes, for example, a binary/multi-value converter 421, a resolution level converter 422, a color converter 423 and an image outputting unit 424. The master image processing unit 402 can be devised as the specialized device 80 (see FIG. 2), devised by one or a combination of hardware and software such as the ASIC controlled by software. The comparison inspection unit 404 and the master image processing unit 402 can be configured using the ASIC as described above. Further, the comparison inspection unit 404 and the master image processing unit 402 can be configured using a software module executable by the CPU 10.

Figures 8, 9:
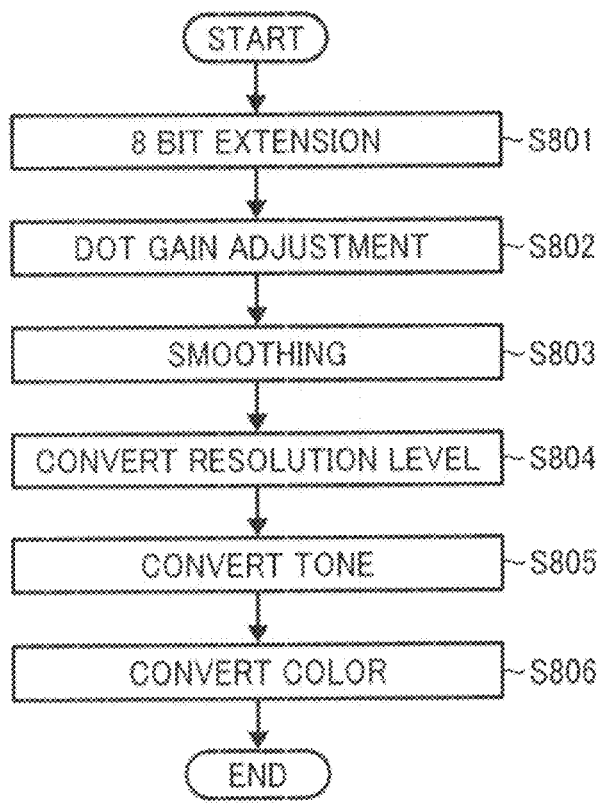
FIG. 8 shows an example flowchart illustrating processes performed by the master image processing unit according to an exemplary embodiment.
FIG. 9 shows an example of a smoothing filter according to an exemplary embodiment.

As shown in FIG. 8, the binary/multi-value converter 421 performs 8-bit extension processing in step S801, dot gain correction processing (i.e., dot gain adjustment) in step S802, and data smoothing processing in step S803 as binary/multi-value converting processing. 1-bit data that is composed of a 0 or 1 is converted into the 8-bit data by the 8-bit extension processing. For example, 0 is converted into 0, and 1 is converted into 255, by the 8-bit extension processing.

The dot gain correction processing is performed in coordination with the density of an image around a pixel having a pixel value of 255, that is to say, a color pixel of 8-bit bitmap data. The data smoothing processing smoothes the image of the pixel having a pixel value of 255 using a smoothing filter shown in FIG. 9. By the dot gain correction processing, the image is corrected in consideration of the dot gain. Therefore, the master image processing unit 402 can generate the master image depending on output properties for every pixel of the image which the print engine 3 outputs.

Now, when the print engine 3 performs the image output based on the image of another binary data except 1-bit data, for example, 2-bit data, a gradation level is 0, a gradation value is one of four values such as 0, 1, 2, and, 3. Therefore, 0 is converted into 0, 1 is converted into 85, 2 is converted into 170 and 3 is converted into 255 by the 8-bit extension processing.

The resolution level converter 422 conducts resolution level conversion processing to match a resolution level of a multi-valued image generated by the binary/multi-value converter 421 to a resolution level of the scanned image data (i.e., an inspection target image) in step S804. Because the scanner 400 generates scanned image data, for example, with a resolution level of 200 dots per inch (dpi), the resolution level converter 422 converts a resolution level of the multi-valued image generated by the binary/multi-value converter 421 to 200 dpi. Moreover, the resolution level converter 422 adjusts the size of the image subjected to the resolution level conversion based on a predetermined magnification, considering shrinkage of a sheet etc. output by the print processing unit 301.

The color converter 423 obtains the image having the resolution level converted by the resolution level converter 422, and conducts a gradation conversion in step S805 and color converting processing in step S806. The gradation conversion in step S805 is an opposite processing to the processing conducted by the DFE 1 based on the gradation correction table. That is to say, based on the gradation correction table input by the bitmap transmitter 203, the color converter 423 conducts the gradation conversion for returning the density adjusted by DFE 1 for generating the bitmap data to an original density before the correction.

Moreover, as described above, because the scanned image data is an RGB-format image as described above, the color converter 423 converts the CMYK-format image converted to the appropriate resolution level by the resolution level converter 422 to the RGB-format image, with which a multi-valued image of 200 dpi expressed via 8-bits for each one of R, G, and B (total 24 bits) for each corresponding pixel is generated. That is to say, a binary/multi-value converter 421, a resolution level converter 422, a color converter 423 and an image outputting unit 424 function as an inspection reference image generator.

The image outputting unit 424 performs a variable magnification process with respect to the 8-bit RGB pixel values, which correspond to the 200 dpi image formed by and received from the color converter 423. Accordingly, the inspection apparatus 4 can match a size of the read image received from the scanner 400 and the master image generated by the master image processing unit 402 such that the position shift of an image can be reduced.

Figure 10A:
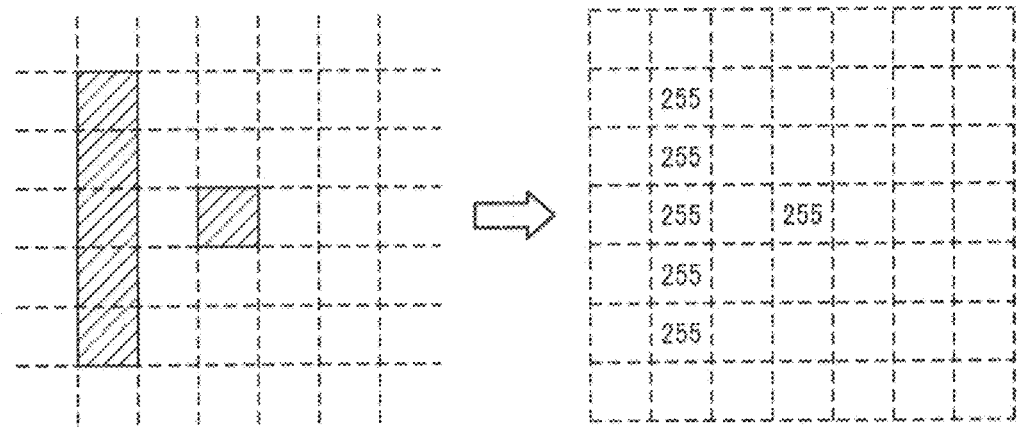
FIGS. 10A-10C show examples of different dot gains according to an exemplary embodiment.
Figure 10B:
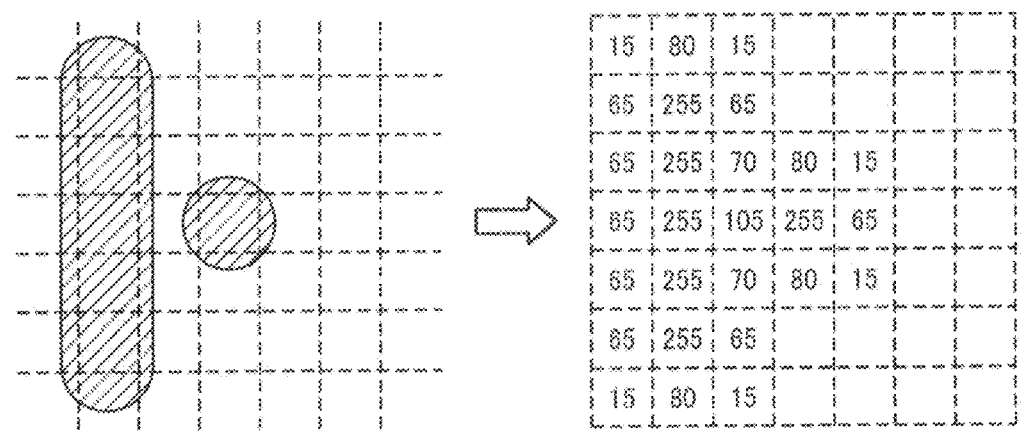
Figure 10C:
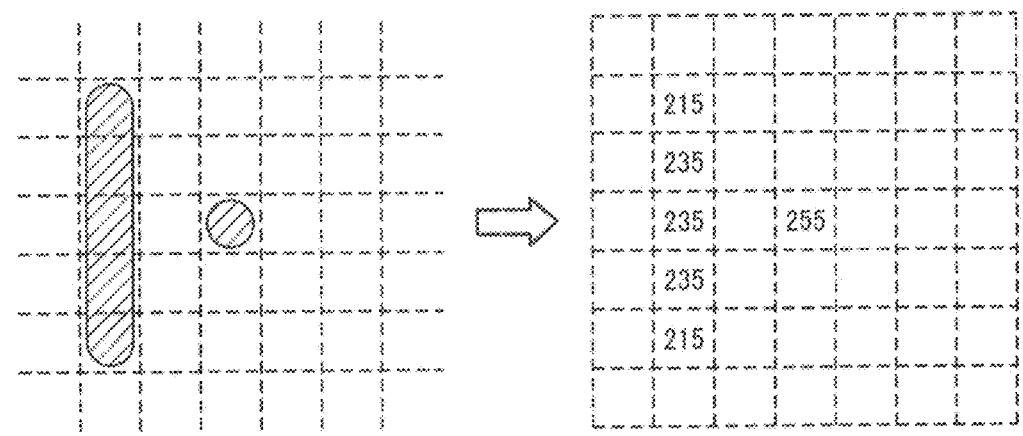

Dot gain correction is described in more detail with respect to FIGS. 10A-10C. FIGS. 10A-10C show examples of a difference of the dot gain according to an exemplary embodiment. FIG. 10A shows an image area specified as colored pixels in a binary image data comprising a colored image/colorless image (i.e., an image including colored and colorless pixels). That is to say, FIG. 10A shows an ideal image output by the print engine 3 when an ideal image forming operation is conducted on the recording medium based on the image data.

Moreover, FIG. 10A shows pixel values of respective pixels of the read image, which is generated, when the ideal image is scanned by the scanner 400. In addition, in FIGS. 10A-10C, the colorless pixels, that is to say, the pixels, which have pixel values of 0, are displayed in blank spaces. As shown in FIG. 10A, the colored areas do not extend into the area of another pixel area. Therefore, in principle, the pixel value of the colored pixel is 255 and the pixel value of the colorless pixel is 0.

FIG. 10B shows an example of an image expanded with the dot gain when the print engine 3 conducts the image forming operation based on the bitmap data. Pixel values of respective pixels of the read image, which is generated, when the image expanded with the dot gain is scanned by the scanner 400 is illustrated on the right side of FIG. 10B. As shown in FIG. 10B, the colored areas extend into the areas of other pixels around the colored pixels. Therefore, the pixel value of the colored pixel is 255, which indicates a solid coating, and the pixel values of the pixels around the colored pixel are values such as 65 or 15 which indicate a medium density value according to a protrusion amount of the one or more colored pixels.

On the other hand, FIG. 10C shows an example of an image shrunk with the dot gain when the print engine 3 conducts the image forming operation based on the bitmap data. Pixel values of respective pixels of the read image, which is generated, when the image shrunk with the dot gain is scanned by the scanner 400 is illustrated on the right side of FIG. 10C. As shown in FIG. 10C, the colored area shrinks, and the area on which the image is to be formed are not completely filled. Therefore, the pixel values of the pixels which indicate a solid coating are values such as 215 or 235 according to a shrinkage amount.

Thus, the density of the printed and read image changes according to the dot gain of the print engine 3. The binary/multi-value converter 421 corrects according to the dot gain of the print engine 3 as shown in FIGS. 10A-10C and the smoothing processing is conducted on the 8-bit expanded image. Therefore, generation of the master image considering the dot gain of the print engine 3 is made possible.

A description is given of a filter (hereinafter, referred to as a dot gain correction filter) using the dot gain correction with respect to FIG. 11. FIG. 11 shows examples of the dot gain correction filter coefficients. As shown in FIG. 11, the dot gain correction filter is used to calculate 3 dots in the vertical direction and 3 dots in the horizontal direction, that is to say, 9 dots as object pixels. In the dot gain correction filter, a coefficient to multiply a central pixel of the object pixels is a, the coefficient to multiply pixels that are above/below the central pixel of the object pixels is b, the coefficient to multiply pixels that are to the left/right of the central pixel of the object pixels is c, and the coefficient to multiply pixels diagonal to the central pixel of the object pixels is d.

In the case of application of the dot gain correction filter shown in FIG. 11, a calculation target pixel is superposed on a center of a. In certain embodiments, a dot gain corrected image is generated by applying the dot gain correction filter to each colored pixel, as a calculation target pixel, of an image to be corrected (e.g., a master image). The new image is generated based on the total pixel values which are determined by multiplying the coefficients of the dot gain correction filter with the pixel values of each colored pixel, as illustrated for example in FIG. 13.

With this configuration, a density fluctuation caused by the shrinkage of the target pixel itself is calculated in accordance with the coefficient a. Effects to the target pixel caused by an expansion of the pixel around the target pixel are calculated in accordance with the coefficients b, c, and d. That is to say, the dot gain corresponding to expansion of the pixel and the dot gain corresponding to shrinkage of the pixel can be calculated in accordance with one or a combination of the coefficients a, b, c, and d. The coefficients a, b, c, and d are settings used for correction of the density of the master image.

Figure 13:
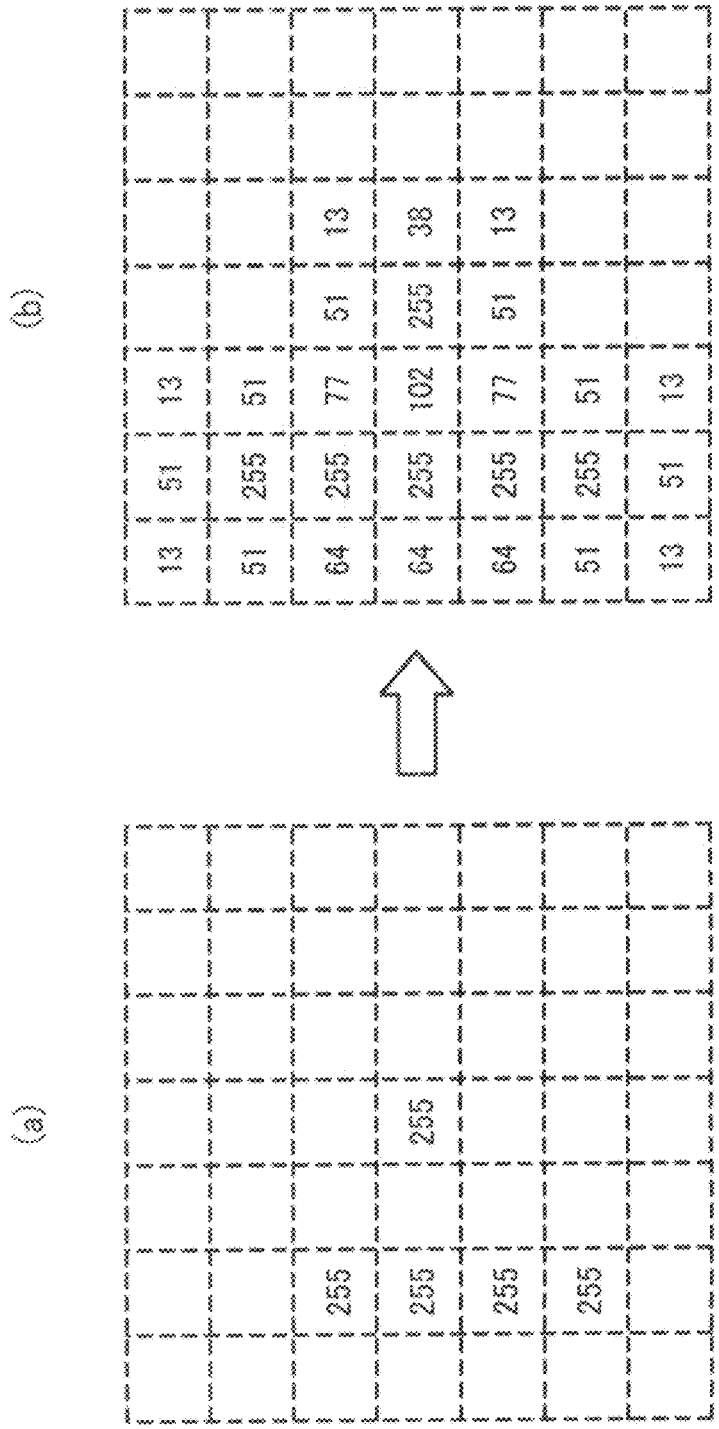
FIG. 13 shows an example of image expansion according to an exemplary embodiment.
Figure 15C:
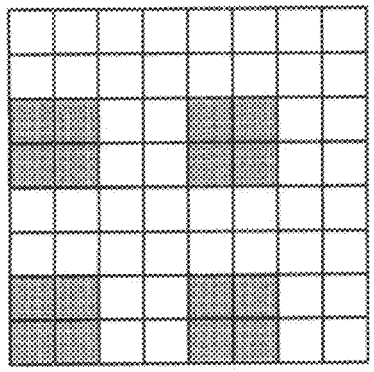
FIGS. 15A-15E show examples of square patches included in the pattern output for the calculation the dot gain correction parameters according to an exemplary embodiment.
Figure 15B:
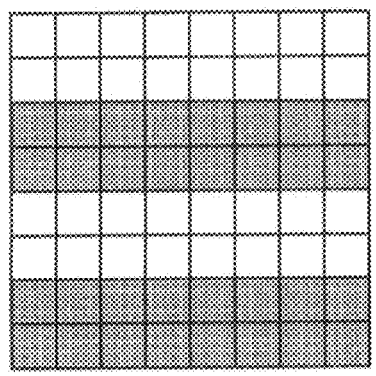
Figure 15E:
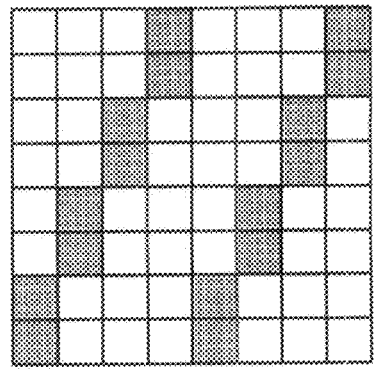
Figure 15A:
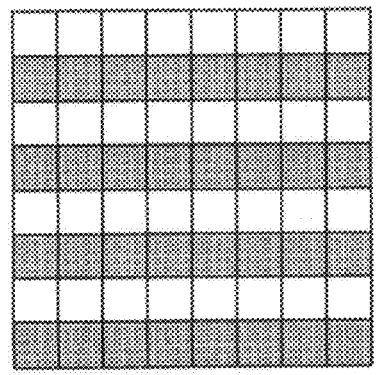
Figure 15D:
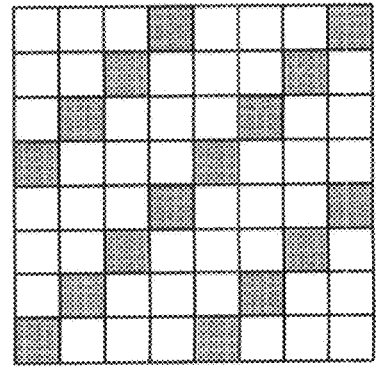

FIGS. 12A and 12B show examples of the coefficients as shown in FIG. 11. FIG. 12A shows examples of the coefficients of the expansion of the pixel. FIG. 12B shows examples of the coefficients of the shrinkage of the pixel. FIG. 13 shows an example of the application of dot gain correction to the 8-bit expanded image, shown in FIG. 10A, by using the values shown in FIG. 12A as the coefficients of the dot gain correction filter, shown in FIG. 11.

FIG. 13(a) shows an example of the pixel values of the image shown in FIG. 10A, prior to expansion. FIG. 13(b) shows an example of pixel density expansion of the pixel values after application of the dot gain correction to the 8-bit image shown in FIG. 13(a) by using the values shown in FIG. 12A for each of coefficients of the dot gain correction filter shown in FIG. 11.

As illustrated in FIG. 13(b), corrected pixel values are based on the original pixel values, as illustrated in FIG. 13(a), and the effects of any pixels bordering (e.g., surrounding or adjacent) to the original pixels, as defined by the dot gain correction filter. For example, taking the pixel at column 1, line 1 as a target pixel to be corrected, the target pixel is a colorless pixel with a pixel value equal to 0. Further, among the pixels bordering the target pixel, only the pixel at column 2, row 2 does not have a pixel value of 0. Thus the corrected target pixel value of 13 is determined by multiplying the pixel value of 255 at column 2, row 2 with the dot gain correction filter coefficient d, which corresponds to the effect on the pixel at column 1, row 1 (i.e., 255 multiplied by 0.05). The multiplication result is approximately 13 such that the target pixel value is set to 13.

Moreover, for example, when dot gain correction is to performed on the pixel at column 1, row 2 as the target pixel, it is noted that only the pixels at column 2, line 2 and 3, which border the target pixel do not have a pixel value of 0. The coefficient that defines the effect of the pixel at column 2, row 2 on the target pixel is the coefficient c (e.g., 0.15), and the coefficient that defines the effect of the pixel at column 2, row 3 on the target pixel is the coefficient d (e.g., 0.05). Therefore, since the total effect of the pixels at column 2, rows 2 and 3 on the target pixel is the sum of 255 multiplied by 0.15 (approximately 38) and 255 multiplied by 0.05 (approximately 13), the calculation result of the target pixel at column 1, row 2 is 51.

When the values of all the pixels in FIG. 13(a) are calculated by using the values shown in FIG. 12A as the coefficients of the dot gain correction filter shown in FIG. 11, a corrected image, which is comprised of the pixel values shown in FIG. 13(b), is obtained. In addition, even if the value of the calculation result of the target pixel is over 255, the value of the calculation result of the target pixel is set to 255. When the values of the pixels as shown in FIG. 13(b) are matched with the values of the pixels as shown on the right side of FIG. 10B, both values of the pixels are not same. However, both values of the pixels are similar. If the coefficients of the pixels as shown in FIGS. 12A and 12B are accurately set, accurate dot gain correction can be performed.

Next, a description is given of processing for accurately setting the coefficients for dot gain correction. As described above, the print engine 3 outputs a color patch for the dot gain correction. The scanner 400 scans the color patch for the dot gain correction, and outputs the read data. The setting value calculation unit 432 calculates the above correction coefficients a-d based on the read data. FIG. 14 shows examples of the color patch for the dot gain correction.

As shown in FIG. 14, a plurality of square patches in every line, for each of CMYK, are formed on the color patch for the dot gain correction. Each of the square patches is arranged with colored/colorless pixels. The image as shown in FIG. 14 is a determining image output for determining the output characteristics of each of the pixels output by the print processing unit 301. FIG. 15 shows examples of the square patches included in the color patch for the dot gain correction.

As shown in FIGS. 15A-15E, each square patch, included in the color patch for the dot gain correction, is an image formed of 64 pixels (8 multiplied by 8 is approximately 64 pixels), in which are arranged colored/colorless pixels. The determining image, that is to say, the color patch for the dot gain correction is the image that contains a plurality of square patches containing dot patterns.

The inspection result obtainer 431 retains information (hereinafter, referred to as a patch position information) showing a position of each square patch shown in FIG. 14. The inspection result obtainer 431 obtains the read image of the color patch for the dot gain correction from the read image obtainer 401. The inspection result obtainer 431 analyzes the read image of the color patch for the dot gain correction based on the above patch position information and generates information showing a density of each square patch shown in FIG. 16.

A value of the density, as shown in FIG. 16, for example, is the total amount of the value of the pixel of the read image in area of each square patches based on the above patch position information. In addition, in the color patch for the dot gain correction, as shown in FIG. 14, 64 pixels can be all colored or colorless pixels. Moreover, the density, as shown in FIG. 16, is the value of the pixels of the read image. Therefore, as shown in FIG. 16, the density can be obtained for each R, B, and G.

In each square patch, a calculation formula is set so as to calculate each of the coefficients a-d. A description is given of a detail of a setting method of the calculation formula with reference to FIGS. 17A-17C. In all the pixels included in each of the square patches shown in FIG. 15, the calculation formula showing an influence of other pixels around a target pixel on the target pixel is set.

Figure 17A:
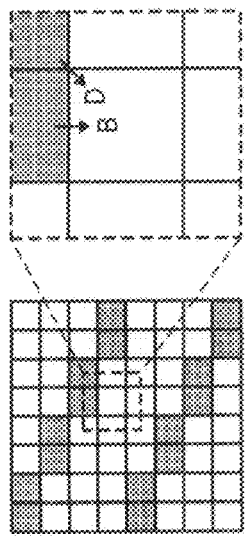
FIGS. 17A-17C show examples of setting coefficients for calculating the dot gain correction value according to an exemplary embodiment.

For example, in FIG. 17A, when the pixel surrounded in broken lines is the target pixel, the colored pixels around the target pixel is an upper pixel and an upper right pixel. Therefore, the influence of the other pixels on the target pixel in FIG. 17A is the influence obtained by the coefficient b by one pixel and the influence obtained by the coefficient d by one pixel.

Figure 17B:
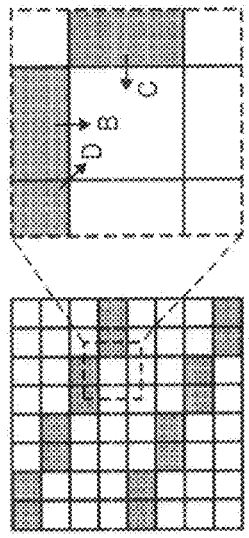

In FIG. 17B, when the pixel surrounded in broken lines is the target pixel, the colored pixels around the target pixel is an upper pixel, an upper left pixel, and a right pixel. Therefore, the influence of the other pixels on the target pixel in FIG. 17B is the influence obtained by the coefficient b by one pixel, the influence obtained by the coefficient c by one pixel, and the influence obtained by the coefficient d by one pixel.

Figure 17C:
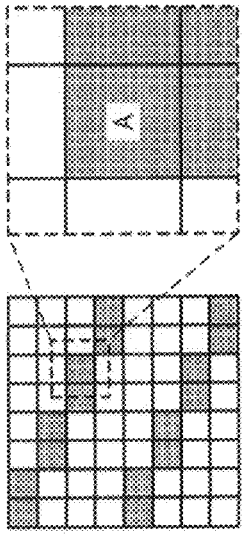

In FIG. 17C, when the pixel surrounded in broken lines is the target pixel, the target pixel is the colored pixel. Therefore, the target pixel is influenced by only the shrinking itself. Therefore, the influence of other pixels on the target pixel in FIG. 17C is ignored, the influence on the target pixel in FIG. 17C is obtained by the coefficient a by one pixel. In addition, even if the target pixel is the colored pixel, the target pixel can be influenced by not only the shrinking itself, but by other pixels around the target pixel. Therefore, in certain embodiments, the influence on the target pixel in FIG. 17C can also be in view of the influence of each of the coefficients a-d.

In each of the square patches, also referred to as dot patterns, shown in FIGS. 14 and 15A-15E, the total amount of other pixels and the central pixel itself having an influence on the density upon the central pixel (i.e., the target pixel) is calculated so as to obtain the calculation formula to calculate each of the coefficients a-d. That is to say, in each of the square patches shown in FIG. 14, and FIGS. 15A-15E, by calculating the total amount of up/down pixels with respect to all pixels, the total amount of pixels influencing the density of coefficient b, with respect to the target pixel, is calculated. Similarly, by calculating the total amount of left/right pixels with respect to all pixels, the total amount of pixels influencing the density of coefficient c, with respect to the target pixel, is calculated. Similarly, by calculating the total amount of diagonal pixels with respect to all pixels, the total amount of pixels influencing the density of coefficient d, with respect to the target pixel, is calculated. Similarly, by calculating the total amount of all colored pixels that are target pixels, the total amount of pixels influencing the density of coefficient a, with respect to the target pixel, is calculated. FIG. 18 shows examples of the calculated total amount of pixels influencing the density of each coefficient a-d, with respect to the target pixel.

The total amount of pixels, shown in FIG. 18, indicates the influence of the density of each coefficient a-d, with respect to the target pixel. If all the pixels (e.g., 64 pixels) in a square patch are colored pixels, the density of the square patch is 1. If all of the pixels (e.g., 64 pixels) in a square patch are colorless pixels, the density of the square patch is 0. Then, based on the above density of each of the square patches, a normalized value of the density of the square patch n is density $P_n$.

For example, in each of the patches #1-#3 shown in FIG. 18, the densities of the square patches extracted from the read image of the color patch for the dot gain correction is expressed by formulas (1)-(3). The right part of formulas (1)-(3) is the sum of each coefficient a-d multiplied by the total amount of pixels influencing the density of each of the coefficients a-d, with respect to the target pixel. That is to say, the right part of formula (1)-(3) is the total influence on the density of each of the pixels forming the respective square patches according to the output characteristics for each of the directions of the next pixel.

$$P_1 = 32a + 64b + 64c + 128d \quad (1)$$

$$P_2 = 32a + 32b + 32c + 128d \quad (2)$$

$$P_3 = 16a + 16b + 16c + 16d \quad (3)$$

The above normalized density $P_n$, can be obtained based on the density of each of the square patches described above referring to FIG. 16. By making the relational expression indicating the correlation between the above normalized density Pn and the coefficients a-d, values of a-d whose coefficients are the total amount of pixels shown in FIG. 18 influencing the density of each of the coefficients a-d, with respect to the target pixel, can be obtained as the value of the dot gain correction filter of FIG. 11.

The setting value calculation unit 432 calculates the above $P_n$ as follows. The density $Q_W$ of a patch in which all pixels are colorless pixels is subtracted from the density $Q_n$ of each square shown in FIG. 16 (a result of the subtraction is a result $Q_N$). The density $Q_W$ is subtracted from the density $Q_B$ of a patch that all pixels are colored pixels (a result of the subtraction is a result $Q_D$). Thus, $P_n$ is obtained by dividing the result $Q_N$ with the density $Q_D$. That is to say, $P_n$ is obtained by calculating a formula (4). The coefficients a, b, c, d are obtained by calculating formulas (1)-(4).

$$P_n = \frac{Q_n - Q_W}{Q_B - Q_W} \quad (4)$$

In addition, the densities in FIG. 16 are represented by R, G and B values. Whereas, as described above referring to FIG. 14, the color patch for the dot gain correction is represented by CMYK. Therefore, the setting value calculation unit 432 calculates the described above formulas (1)-(4) based on the following correspondence. The setting value calculation unit 432 calculates C using a value of R, calculates M using a value of G, calculates Y using a value of B and calculates K using a total value of R, G and B or an average value of R, G and B.

The setting value calculation unit 432 calculates the plurality of relational expressions about coefficients a-d and solves the plurality of relational expressions by the least squares method. Thus, the setting value calculation unit 432 determines the coefficients a-d. The setting value calculation unit 432 calculates the coefficients a-d, which are the setting values (e.g., coefficients a, b, c, d) for the density correction according to the output characteristics, based on the relation between the total results of the output characteristics of each of the square patches and the density of each of the square patches extracted from the read image of the color patch for the dot gain correction. Thus, suitable coefficients a, b, c, d of respective CMYK values in the filter of FIG. 11 can be obtained.

The setting value calculation unit 432 calculates the coefficients a, b, c, d of respective CMYK values, and inputs the coefficient of the respective CMYK into the binary/multi-value converter 421. Thus, the binary/multi-value converter 421 can conduct the dot gain correction processing described above with reference to FIG. 13 according to the suitable coefficients a-d obtained.

Numerous additional modifications and variations are possible in light of the above teachings. It is therefore to be understood that within the scope of the appended claims, the disclosure of the present disclosure may be practiced otherwise than as specifically described herein.

With some embodiments of the present disclosure having thus been described, it will be obvious that the same may be varied in many ways. Such variations are not to be regarded as a departure from the spirit and scope of the present disclosure, and all such modifications are intended to be included within the scope of the present disclosure.

For example, when the DFE 1 or another information processing apparatus can obtain the density of each of the square patches extracted from a read image of a color patch for dot gain correction, and the total amount of pixels influencing the density of each of the coefficients a-d with respect to the target pixel, the DFE 1 or the other information processing apparatus can function as the setting value calculation unit.

When the setting value calculation unit 432 is carried out in this way and the coefficients of a-d of CMYK for each color is required, it will set the result to the binary/multi-value conversion process part 421 of the master image process part 402.

Thereby, the binary/multi-value conversion process part 421 is enabled to perform dot gain correction, which was demonstrated in FIG. 13, according to the coefficients of a-d required suitably as above-mentioned.

Further, in certain embodiments, the dot gain can vary according to a kind of the paper used. Therefore, the coefficients a-d calculated by the above processing are stored for each kind of the paper into memory (e.g., ROM, etc.). The setting value calculation unit 432 inputs the coefficients a-d read from ROM according to the kind of the paper into the master image processing unit 402.

The invention claimed is:

1. An information processing apparatus, comprising:
   a read image obtainer implemented by circuitry and configured to obtain a scanned determination image including a plurality of different dot patterns output by an image forming apparatus on a recording medium, the determination image being an image output by the image forming apparatus to determine output characteristics of the image forming apparatus; and
   a setting value calculator implemented by the circuitry and configured to
      for each of the different dot patterns of the obtained scanned determination image,
         determine densities of different colors of the respective dot pattern, and
         determine a total number of pixels influencing the density of each coefficient of a dot gain correction filter, with respect to each target pixel, and
      calculate the coefficients of the dot gain correction filter based on the determined densities of the different colors of the different dot patterns and the total number of pixels, determined for each coefficient of the dot gain correction filter and for each of the different dot patterns.

2. The information processing apparatus according to claim 1, wherein
   the dot gain correction filter includes coefficients a-d,
   the coefficient a is applied a central pixel to be corrected,
   the coefficient b defines the influence of a pixel that is vertically-adjacent to the central pixel,
   the coefficient c defines the influence of a pixel that is horizontally-adjacent to the central pixel, and
   the coefficient d defines the influence of a pixel that is diagonally-adjacent to the central pixel.

3. The information processing apparatus according to claim 2, wherein
   the coefficient b defines the influence of each pixel that is vertically-adjacent to the central pixel,
   the coefficient c defines the influence of each pixel that is horizontally-adjacent to the central pixel, and
   the coefficient d defines the influence of each pixel that is diagonally-adjacent to the central pixel.

4. The information processing apparatus according to claim 1, wherein the information processing apparatus is configured to inspect a scanned image obtained by scanning an image output on a recording medium, and further comprises:
   an inspection reference image generator implemented by the circuitry and configured to generate an inspection reference image to inspect the scanned image based on image data of the image output on the recording medium; and
   an inspection result acquisition unit implemented by the circuitry and configured to acquire a result of a defect determination of the scanned image based on a comparison between the inspection reference image and the scanned image, wherein
   the inspection reference image generator corrects the density of the image data to be processed in generating the inspection reference image based on the coefficients.

5. The information processing apparatus according to claim 1, wherein the setting value calculator is configured to calculate the coefficients which are used to perform density correction of image data to be processed when an inspection reference image is generated, and
   calculates values indicating the output characteristics of each pixel and pixels surrounding the respective pixel as the coefficients based on (1) a calculation result calculated by adding up an influence on density by the output characteristics of each pixel and the pixels surrounding the respective pixels for each of the different dot patterns, and (2) a relationship between the determination image and a density of each of the different dot patterns extracted from the scanned determination image.

6. A method of an information processing apparatus for dot gain correction, the method comprising:
   obtaining a scanned determination image including a plurality of different dot patterns output by an image forming apparatus on a recording medium, the determination image being an image output by the image forming apparatus to determine output characteristics of the image forming apparatus; and
   for each of the different dot patterns of the obtained scanned determination image,
      determining densities of different colors of the respective dot pattern, and
      determining a total number of pixels influencing the density of each coefficient of a dot gain correction filter, with respect to each target pixel; and
   calculating, by circuitry of the information processing apparatus, the coefficients of the dot gain correction filter based on the determined densities of the different colors of the different dot patterns and the total number of pixels, determined for each coefficient of the dot gain correction filter and for each of the different dot patterns.

7. A non-transitory computer-readable storage medium storing instructions which when executed by a computer cause to computer to perform a method of dot gain correction, the method comprising:
   obtaining a scanned determination image including a plurality of different dot patterns output by an image forming apparatus on a recording medium, the determination image being an image output by the image forming apparatus to determine output characteristics of the image forming apparatus; and
   for each of the different dot patterns of the obtained scanned determination image,
      determining densities of different colors of the respective dot pattern, and
      determining a total number of pixels influencing the density of each coefficient of a dot gain correction filter, with respect to each target pixel; and
   calculating, by the computer, the coefficients of the dot gain correction filter based on the determined densities of the different colors of the different dot patterns and the total number of pixels, determined for each coefficient of the dot gain correction filter and for each of the different dot patterns.

* * * * *